United States Patent [19]

Adlerborn et al.

[11] Patent Number: 4,478,789

[45] Date of Patent: Oct. 23, 1984

[54] METHOD OF MANUFACTURING AN OBJECT OF METALLIC OR CERAMIC MATERIAL

[75] Inventor: Jan Adlerborn, Hans Larker, Bertil Mattsson; Jan Nilsson, all of Robertsfors, Sweden

[73] Assignee: ASEA AB, Västerås, Sweden

[21] Appl. No.: 582,486

[22] Filed: Feb. 22, 1984

Related U.S. Application Data

[60] Division of Ser. No. 426,939, Sep. 29, 1982, Pat. No. 4,446,100, which is a continuation of Ser. No. 102,336, Dec. 11, 1979, abandoned.

[51] Int. Cl.³ ............................................. B22F 3/00
[52] U.S. Cl. ...................................... 419/49; 419/48; 419/56; 264/56; 264/319
[58] Field of Search ............... 419/48, 49, 56; 264/56, 264/319

[56] References Cited

U.S. PATENT DOCUMENTS

| | | | |
|---|---|---|---|
| 3,229,971 | 1/1966 | Gurganas et al. | 75/226 |
| 3,455,682 | 7/1969 | Barbaras | 75/226 |
| 3,700,435 | 10/1972 | Chandhok | 75/226 |
| 3,804,575 | 4/1974 | Chandhok | 75/226 |
| 3,992,200 | 11/1976 | Chandhok | 75/226 |
| 4,081,272 | 3/1978 | Adlerborn | 75/226 |
| 4,108,652 | 8/1978 | Ogawa | 75/223 |

Primary Examiner—Benjamin R. Padgett
Assistant Examiner—T. J. Wallen
Attorney, Agent, or Firm—Lalos, Leeds, Keegan, Lett, Marsh, Bentzen & Kaye

[57] ABSTRACT

An object of ceramic or metallic material is manufactured by isostatic pressing of a body preformed from a powder of the metallic or ceramic material, the preformed body (10) then being embedded in glass, for example in a mass of glass particles (16) in a vessel (15) which is resistant to the temperature at which the sintering of the metallic or ceramic material is carried out, the material embedding the preformed body being transferred to a melt having a surface limited by the walls of the vessel, below which surface the preformed body is located, and a pressure necessary for the isostatic pressing of the preformed body then being applied on the melt by a gaseous pressure medium.

3 Claims, 4 Drawing Figures

METHOD OF MANUFACTURING AN OBJECT OF METALLIC OR CERAMIC MATERIAL

CROSS-REFERENCE TO RELATED APPLICATIONS:

This is a divisional application of co-pending application Ser. No. 426,939 filed Sept. 29, 1982, now U.S. Pat. No. 4,446,100, which in turn is a continuation of application Ser. No. 102,336 filed Dec. 11, 1979, now abandoned.

In the manufacture of objects of metallic or ceramic material by sintering powder of the material while using isostatic pressing, the powder is suitably preformed into a manageable powder body. This can be done by loose sintering, i.e. by sintering a powder, filled into a forming cavity, in vacuum or protective gas so that a coherent body is formed but no mentionable densification takes place. It can also be done by subjecting the powder to an isostatic compaction, for example arranged in a sealed capsule of yielding material, such as a plastic capsule. The compaction can be carried out with advantage without the use of a binder at room temperature or any other temperature which is considerably lower than the temperature during the compression in connection with the sintering. The product can thereafter be given its desired shape by machining. For the preforming it is also possible to use, among other things, conventional technique for the manufacture of ceramic goods. Thus, usually the powder is mixed before the forming with a temporary binder, for example methyl cellulose, cellulose nitrate, an acrylate binder, a wax or a mixture of waxes. After the preforming the binder is driven off by heating so that the preformed powder body in all essentials becomes free from binder.

When the preformed powder body is subjected to the isostatic pressing at the sintering temperature, it must, in order to give a desired dense, sintered product, be enclosed in a casing which, during the pressing, is able to prevent the pressure medium then used, normally a gas, from penetrating into the powder body. The casing, like its contents, is liberated from undesirable gases during a process stage prior to the sealing. Various ways of forming the casing are known. According to one known method, a preformed capsule of glass is used as casing. According to another known method the casing is manufactured on the spot by dipping the preformed powder body into a suspension of particles of glass, or surrounding it in some other manner with a layer of particles of glass and then heating it under vacuum at such a temperature that the particles form a tight casing around it. As far as silicon nitride is concerned, it is also known to use a porous layer of a glass of a low-melting type outside a porous layer of glass of a high-melting type. In the known case, the outer porous layer is transformed into a layer impermeable to the pressure medium while the powder body is degassed. When a tight layer has been formed, pressure is applied to the enclosed powder body by argon or helium to counteract dissociation of the silicon nitride when the temperature is continually raised. During the continued temperature increase, the glass in the outer layer reacts with the material in the inner porous layer while forming an increasingly high-melting glass and while maintaining a layer impenetrable to the pressure medium, and finally a glass layer which is impenetrable to the pressure medium is formed from the innermost part of the inner porous layer before the glass in the outer layer has time to run off. This last formed glass layer forms a casing around the powder body when the isostatic pressing thereof is carried out at the sintering temperature.

In certain cases it has been found that there are problems in achieving a desirably great reproducibility in the manufacture of objects of powder material while using the known methods described above, especially when it is a question of objects having a complicated shape such as objects having sharp corners or edges or having thin-walled portions such as turbine disks with blades. If a preformed capsule of glass is used, there is a risk that the glass, when softening, is accumulated in pockets and, because of a relatively high viscosity, may cause damage there in thin-walled portions of the preformed powder body in connection with a high pressure being applied for the isostatic pressing of the powder body. If the casing is manufactured on the spot by surrounding the powder body with layers of particles of glass, there is a risk, which is also present when using a preformed body of glass, that the powder body in certain places, especially at sharp corners or edges, is not covered by any casing material when the pressing is to be carried out, because the glass is not retained there.

According to the present invention, it has proved to be possible to manufacture objects of powder material with high density with greater reproducibility than with the previously mentioned methods.

The present invention relates to a method of manufacturing an object of metallic or ceramic material by isostatic pressing of a body preformed from a powder of the metallic or ceramic material with a gaseous pressure medium, the preformed body then being embedded in an embedding material consisting of glass or of a material forming glass upon heating, which embedding material is transformed to a casing impermeable to gas, before the isostatic pressing is carried out while sintering the preformed body, characterised in that the preformed body and the embedding material are placed in a vessel which is resistant to the temperature at which the sintering of the metallic or ceramic material is carried out, that the embedding material is transformed into a melt having a surface limited by the walls of the vessel, with the preformed body located below the surface of the melt, and that a pressure required for the isostatic pressing is applied to the melt with the gaseous pressure medium.

The word melt in the description and the claims refers to a gas-impermeable mass, which at least partly and preferably at least for the main part consists of molten phase. It is thus not necessary that all the constituents of the embedding material have melted in their entirety in order for a functioning gas-permeable mass, here included in the concept melt, to have formed. The melt has an at least substantially horizontal surface.

It is essential that the melt is subjected to pressure by a gaseous pressure medium, which takes place in a heatable high-pressure chamber, and not by a piston in a mould cavity, in which the melt is enclosed while making contact with the walls of the mould cavity. In the latter case it is not possible, or at any rate there are extremely great difficulties, to avoid damage to weak portions of the powder body, because it is not possible to maintain a sufficiently low viscosity of the glass melt, since in that case it tends to penetrate out between the piston and the mould cavity.

The invention is of extremely great importance in connection with isostatic pressing of objects of silicon nitride or of materials built up with silicon nitride as the main constituent. The invention will therefore first be described with respect to its application for the manufacture of objects of silicon nitride.

As pressure medium for carrying out the present invention, there are preferred inert gases such as argon and helium, as well as nitrogen gas. The pressure during the sintering of a preformed silicon nitride body is dependent on whether a sintering-promoting additive, such as magnesium oxide or yttrium oxide, has been added to the silicon nitride or not. If no such additive is used, the pressure should amount to at least 100 MPa, preferably to 200-300 MPa. When using a sintering-promoting additive, a lower pressure may be used, however suitably at least 20 MPa. The sintering of the preformed body is suitably carried out at 1600°-1900° C., preferably at 1700°-1800° C.

As material in the vessel which is resistant to the sintering temperature there is preferred graphite, but also other materials such as nitride or molybdenum may be used.

The embedding material may with particular advantage consist of particles of glass or of material forming glass upon heating. The preformed silicon nitride body is then embedded into the particles in the resistant vessel and the particles are transformed into a melt in the vessel, that is, the embedding material is made gas-impermeable in the vessel. It is also possible to use larger pieces of the glass or of the glass-forming material, such as preformed pieces which at least substantially follow the shape of the preformed body. For example, it is possible to use a preformed piece on the lower side of the preformed body and another preformed piece on the upper side of the body, the edges of the pieces then suitably making contact with each other. Depending on the shape of the object, it is also possible in principle to use a capsule of glass formed in one piece and having an opening which is adapted so that the preformed body may be inserted into the capsule. When the embedding material is made from one or a few glass pieces, it is possible to make it gas-impermeable either before or after it has been placed in the vessel. In the first-mentioned case this can be done with advantage in a separate process in a furnace which is suited for this purpose and in the latter case it may be done with advantage in connection with the embedding material being transformed into a melt in the high-pressure furnace in which the isostatic pressing is carried out.

The embedding material may advantageously be made gas-impermeable while maintaining vacuum around it. To avoid a dissociation of the silicon nitride, a glass or a glass-forming material should be used in this case, which makes the embedding material gas-impermeable at a relatively low temperature. Thus, if the embedding material consists of particles of glass or glass-forming material which are made gas-impermeable by being transformed into a melt in the resistant vessel while maintaining vacuum across it, a glass should be used which results in a melt with a low viscosity, suitably at most $10^6$ poises at a temperature of about 1150° C., so that a high pressure may be applied at this temperature without risks of damage to the preformed body arising.

The embedding material may also advantageously be made gas-impermeable while keeping it in contact with a gas which at least for the main part consists of nitrogen gas and in which a pressure is maintained which is at least as great as in the nitrogen gas in the pores of the preformed silicon nitride at the temperature in question. When using this method there may be used a glass or a glass-forming material which makes the embedding material gas-impermeable at a considerably higher temperature than with the vacuum method. If the embedding material consists of particles of glass or a glass-forming material which is made gas-impermeable by being transformed into a melt in the resistant vessel while maintaining nitrogen gas pressure, a glass may be used which gives a melt with low viscosity, suitably at most $10^6$ poises, at considerably higher temperatures than the glass materials which may be used in the vacuum method. The high pressure required for the isostatic pressing is then applied, as in the preceding case, when the melt has acquired a low viscosity, which, depending on the type of glass, may be done in an interval of from around 1150° C. to around 1700° C.

The density of the glass which is used for silicon nitride should be at the most 2.4 g/cm$^3$ in order not to risk that the powder body is raised to such an extent from the melt that certain parts of it will not be covered by molten glass.

If a limited superficial penetration of glass into the pores of the powder body is allowed, it is possible to use a plurality of different glass types which provide melts with such low viscosity, possibly while applying nitrogen gas pressure during the formation of the melt, that the preformed body of silicon nitride is not damaged when the high pressure required for the isostatic pressing is applied. Among other things, different types of lead silicate glass and aluminium silicate glass may be used, as well as quartz and mixtures of different glass-forming oxides. In certain cases it may then be necessary to remove the surface layer on the pressed silicon nitride body, for example by blasting. However, according to the present invention it has been found to be possible to avoid a penetration of glass melt into the preformed silicon nitride body by using a glass containing $B_2O_3$ around the silicon nitride body and a sufficiently small grain size of the silicon nitride, preferably a grain size of less than 5 microns. A plausible explanation why a boron-containing glass does not penetrate into the silicon nitride body is that a boron nitrogen compound, probably boron nitride, is formed at the boundary surface between the glass and the silicon nitride before the glass forms a low-viscous melt and that this boron nitrogen compound counteracts the penetration of the glass into the pores of the powder body. The content of $B_2O_3$ in the glass may advantageously amount to between 2 percent by weight and 70 percent by weight. As example of applicable boron-containing glasses may be mentioned a glass containing 80.3 percent by weight $SiO_2$, 12.2 percent by weight $B_2O_3$ 2.8 percent by weight $Al_2O_3$, 4.0 percent by weight $Na_2O$, 0.4 percent by weight $K_2O$ and 0.3 percent by weight CaO (Pyrex ®), a glass containing 58 percent by weight $SiO_2$, 9 percent by weight $B_2O_3$, 20 percent by weight $Al_2O_3$, 5 percent by weight CaO and 8 percent by weight MgO, a glass containing 96.7 percent by weight $SiO_2$, 2.9 percent by weight $B_2O_3$ and 0.4 percent by weight $Al_2O_3$ (Vycor ®) and a glass containing 38 percent by weight $SiO_2$, 60 percent by weight $B_2O_3$, and 2 percent by weight $Al_2O_3$. It is also possible to use mixtures of particles of substances, for example $SiO_2$, $Al_2O_3$, $B_2O_3$ as well as alkali and earth alkali oxides, which form glass when being heated.

After the pressing and the sintering, the finished object of silicon nitride is embedded in the glass. According to an advantageous embodiment of the invention, a glass is used which has approximately the same coefficient of thermal expansion as silicon nitride within a considerable part of the area between the solidification temperature of the glass and room temperature, preferably a coefficient of thermal expansion of $3.0-3.8 \times 10^{-6}$ per °C. within the temperature range 500° C.-20° C. This prevents damage to the object caused by cracks or rupture during the cooling. A suitable glass is the previously mentioned glass containing 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$, and 0.3 percent by weight CaO, which has a coefficient of thermal expansion of $3.2 \times 10^{-6}$ per °C. between 500° C. and 20° C. For silicon nitride the corresponding value is $3.2 \times 10^{-6}$ per °C. It is possible, although it complicates the manufacture of the object to a considerable extent, to manage the exposure of the finished object when using a glass the coefficient of thermal expansion of which is considerably different from that of the silicon nitride. An example of such a glass is the previously mentioned glass containing 96.7 percent by weight $SiO_2$, 2.9 percent by weight $B_2O_3$ and 0.4 percent by weight $Al_2O_3$. Such a glass can be removed substantially completely from the silicon nitride object, for example by reducing the outer pressure below the dissociation pressure of the silicon nitride, for example at 1600° C., the glass then lifting from the silicon nitride body and the object being allowed to cool without being damaged by the glass. In certain cases it may be suitable to remove the glass by increasing the temperature above the temperature used during the sintering in order for the glass to become sufficiently low-viscous to leave only a sufficiently thin film which may not damage the body and which, if necessary, may be removed by blasting.

In the same way as has been described for silicon nitride, the invention may be used for manufacturing objects of materials built up with silicon nitride as main constituent, such as silicon aluminium, oxynitride and the said oxynitride in which aluminium has been at least partly replaced with yttrium, as well as other silicon metal oxynitrides and further mixtures of silicon nitride and silicon metal oxynitride.

Examples of other materials for which the present invention may be used are further iron and nickel-based alloys such as e.g. an iron-based alloy containing 0.33% C, 0.30% Si, 0.40% Mn, 0.01% P, 0.01% S, 2.8% Cr, 0.6% Mo, the remainder being Fe (3% Cr-Mo steel) or an iron-based alloy containing 0.18% C, 0.25% Si, 0.60% Mn, 0.01% P, 0.01% S, 11.5% Cr, 0.5% Ni, 0.5% Mo, 0.30% V, 0.25% Nb, the remainder being Fe (12% Cr-Mo-V-Nb-steel), a nickel-based alloy containing 0.03% C, 15% Cr, 17% Co, 5% Mo, 3.5% Ti, 4.4% Al, 0.03% B, the remainder being Ni, or a nickel-based alloy containing 0.06% C, 12% Cr, 17% Co, 3% Mo, 0.06% Zr, 4.7% Ti, 5.3% Al, 0.014% B, 1.0% V, the remainder being Ni, and further, among other things, a metal oxide such as $Al_2O_3$ and a carbide such as silicon carbide. The above contents expressed in percent, as well as the contents mentioned hereinafter and expressed in percent, refer to percentage by weight.

In addition to the gases previously mentioned, hydrogen gas is suited as pressure medium when pressing metallic materials, particularly if the sealing of the embedding material takes place while supplying gas. The pressure and the temperature during the sintering of the preformed body are, of course, dependent on the properties of the metallic or ceramic material. Normally, the pressure should amount to at least 50 MPa, preferably to at least 100 MPa.

If the material consists of an iron-based alloy the temperature should be at least 1000° C., preferably 1100°-1200° C., and if the material consists of a nickel-based alloy the temperature should be at least 1050° C., preferably 1100°-1250° C. If the material is aluminium oxide the temperature should be at least 1200° C., preferably 1300°-1500° C., and if the material is silicon carbide the temperature should be at least 1700° C. and preferably 1800°-2000° C.

Among the glass types mentioned previously for silicon nitride, for materials with particularly high sintering temperatures, such as silicon carbide, quartz glass may suitably be used in the embedding material.

To prevent glass from penetrating into pores in the powder body of the metallic or ceramic material, it is suitable to surround the powder body with a blocking layer, for example a layer of finely-divided boron nitride or of finely-divided glass having a higher melting temperature than the glass in the embedding material.

The invention will be explained in greater detail by describing examples with reference to the accompanying schematic drawing, in which FIG. 1 shows a body preformed from silicon nitride powder in the form of a turbine wheel for a gas turbine motor seen from above;

EXAMPLE 1

Figure 1:
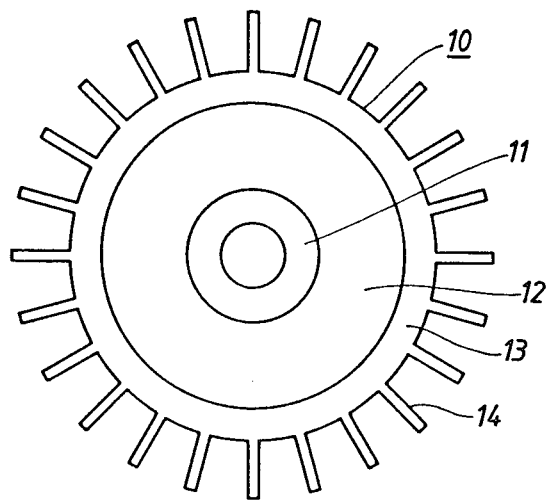
Figure 2:
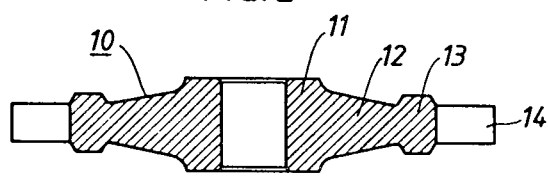
FIG. 2 shows the same body in axial cross-section.

Silicon nitride powder having a powder grain size of less than 5 microns and containing about 0.5 percent by weight free silicon and about 0.1 percent by weight magnesium oxide is placed in a capsule of plastic, for example plasticized polyvinyl chloride, or of rubber, having approximately the same shape as the preformed powder body to be manufactured, whereafter the capsule is sealed and placed in a press device, for example the device shown in FIGS. 1 and 2 of British Pat. No. 1,522,705. The powder is subjected to a compaction at 600 MPa for a period of 5 minutes. After completed compaction the capsule is removed and the preformed powder body thus manufactured is machined into the desired shape. The powder body has a density of 60% of the theoretical density.

The preformed powder body 10, which is shown in FIGS. 1 and 2, consists of a turbine wheel having hub 11, web 12, edge 13 and blades 14.

Figure 3:
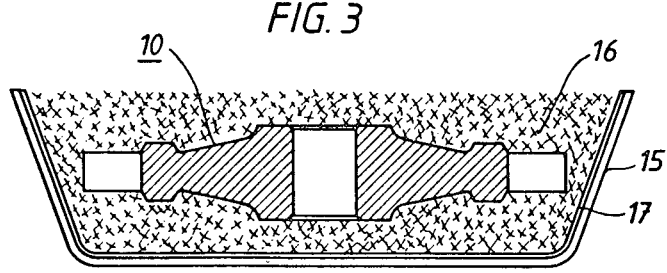
FIG. 3 shows the body placed in a temperature-resistant vessel and embedded in a mass of glass particles.

The powder body 10 is placed, as is clear from FIG. 3, in a vessel 15 which is open at the top, said vessel being resistant to the sintering temperature used, the powder body then being embedded in glass powder 16. The vessel in the exemplified case consists of graphite and is internally provided with a release layer 17 of boron nitride. The glass powder consists of particles of a glass consisting 80.3 percent by weight $SiO_2$, 12.2 percent by weight $B_2O_3$, 2.8 percent by weight $Al_2O_3$, 4.0 percent by weight $Na_2O$, 0.4 percent by weight $K_2O$ and 0.3 percent by weight CaO. Thus, in this case the embedding material consists of particles of glass.

Figure 4:
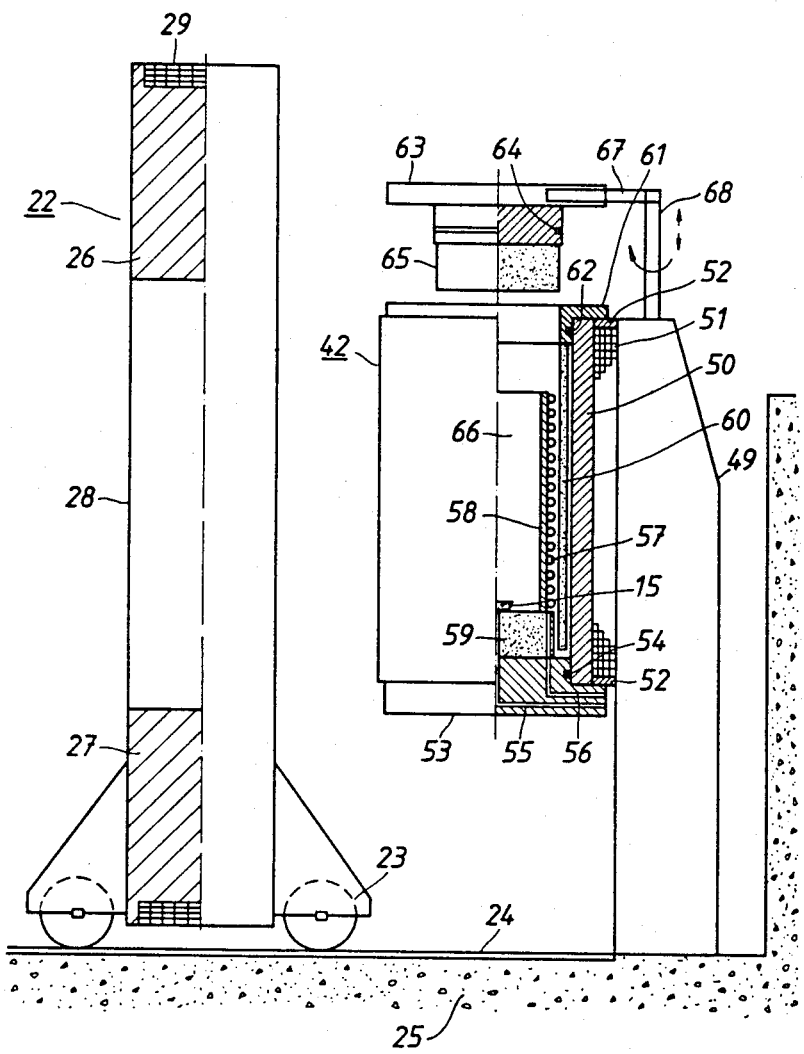
FIG. 4 shows a high-pressure furnace in which the isostatic pressing and the sintering of the preformed powder body are carried out.

One or more vessels 15 are then placed in a high-pressure furnace according to FIG. 4. For the sake of clarity, only one vessel is shown in this figure. In FIG. 4, 22 designates a press stand which is supported by wheels 23 and is displaceable on rails 24 on the floor 25 between the position shown in the figure and a position where the stand surrounds the high-pressure chamber 42. The press stand is of the type which consists of an upper yoke 26, a lower yoke 27 and a pair of spacers 28, which are held together by a prestressed strip sheath 29. The high-pressure chamber 42 is supported by a column 49 and comprises a high-pressure cylinder which is built up of an inner tube 50, a surrounding prestressed strip sheath 51 and end rings which axially secure the strip sheath and constitute suspension means by which the high-pressure chamber is attached to the column 49. The chamber 42 has a lower end closure 53 projecting into the tube 50 of the high-pressure cylinder. The end closure is provided with a groove, in which a sealing ring 54 is inserted, a channel 55 for degassing the products to be pressed and for supplying pressure medium, suitably argon, helium or nitrogen gas, and a channel 56 for cables for feeding heating elements 57 for the heating of the furnace. The elements 57 are supported by a cylinder 58 which rests on an insulating bottom 59, which projects into an insulating mantle 60. The upper end closure comprises an annular portion 61 with a sealing ring 62 sealing against the tube 50. The mantle 60 is suspended from the portion 61 and is gas-tightly connected thereto. The end closure also comprises a lid 63 for sealing the opening of the portion 61, which is usually permanently applied in the high-pressure cylinder. The lid is provided with a sealing ring 64 sealing against the inner surface of the portion 61, and with an insulating lid 65 which, when the high-pressure chamber is closed, projects into the cylinder 60 and constitutes part of the insulating sheel which surrounds the furnace space proper 66. The lid 63 is attached to a bracket 67, which is supported by a raisable, lowerable and turnable operating rod 68. The yokes 26 and 27 absorb the compressive forces acting on the end closures 53 and the lid 63 when pressure is applied to the furnace space.

When the vessel 15 with its contents has been placed in the furnace space 66, the powder body 10 with the surrounding glass powder 16 is degassed at room temperature for approximately 2 hours. During continued evacuation, the temperature is raised to approximately 1150° C. The temperature increase is carried out so slowly that the pressure does not exceed 0.1 torr for any part of the time. At approximately 1150° C. the temperature is maintained constant for about 1 hour, whereafter the final degassing takes place and the glass powder forms a melt with low viscosity, which completely surrounds the powder body 10 and has a horizontal surface. Thereafter, argon or helium is supplied at the same temperature to a pressure level which provides a pressure of 200–300 MPa during final sintering temperature. The temperature is then raised to 1700°–1800° C., that is, to a suitable sintering temperature for the silicon nitride, for a period of 1 hour. At the same time the pressure then rises. A suitable time for sintering under the conditions mentioned is at least 2 hours. After a finished cycle, the furnace is allowed to cool to a suitable discharging temperature. The vessel 15 then contains a blank cake, in which the powder body is visible through the solidified and clear glass. The powder body is completely embedded in the glass and has therefore been located below the surface of the melt in its entirety during the pressing. Because it has been possible to apply the high pressure required for the pressing when the glass has been low-viscous and the glass in solidified form has the same coefficient of thermal expansion as the silicon nitride, flawless objects can be produced with a good reproducibility. The cake is easily released from the vessel because of the presence of the release layer 17. The glass can then be removed from the object by blasting. The density of the object as finished exceeds 99.5% of the theoretical density.

EXAMPLE 2

In an alternative embodiment, there is used a glass containing 96.7 percent by weight $SiO_2$, 2.9 percent by weight $B_2O_3$ and 0.4 percent by weight $Al_2O_3$. With this glass a sufficiently low-viscous melt may be achieved only at 1600° C.

To counteract the dissociation of silicon nitride that occurs at this temperature, the glass mass 16 is transformed into a melt while maintaining a pressure with nitrogen gas in the furnace space 66.

When the vessel with the powder body 10 and surrounding glass powder has been degassed in the furnace space 66 at room temperature for approximately 2 hours, the furnace space is filled with nitrogen gas of atmospheric pressure and the temperature of the furnace is raised to 1600° C. while successively supplying nitrogen gas to a pressure of 0.1 MPa. When the temperature has reached 1600° C., the glass powder forms a melt with low viscosity which completely surrounds the powder body 10. Thereafter argon or helium is supplied at the same temperature and the pressing and the sintering are carried out under the conditions described in the previous example. Since the glass in this case has a coefficient of thermal expansion which differs considerably from that of the silicon nitride, only a limited cooling of the furnace may be allowed before the vessel 15 with its contents is removed. The pressed object is then heated to a temperature of about 1800° C. so that the glass runs off the object and only leaves a thin film on the object. After cooling to room temperature, the film is suitably removed by blasting.

EXAMPLE 3

A divisible form or mould having a cavity shaped as a turbine disk and composed of an aluminium-silicate based material, for example of the same type as is normally used in cores for the investment casting of turbine blades having cooling channels, is filled with spherical powder of an iron-based alloy containing 0.18% C, 11.5% Cr, 0.25% Si, 0.5% Mo, 0.60% Mn, 4.4% Al, 0.01% P, 0.01% S, 0.5% Ni, 0.30% V, 0.25% Nb, the remainder being Fe and having a grain size of less than 250 microns. The powder is vibrated together by striking lightly on the form and the powder is sintered in a vacuum at about 1200° C. for about 2 hours. After cooling, the reusable form is divided and the porous turbine disk having essentially the same dimensions as the forming cavity is removed. The porous turbine disk is thereafter provided with a blocking layer by being coated with a fine-grained powder of a grain size less than 1 micron of a high-melting glass to a thickness of about 0.3 mm. The glass consists of 96.7 percent by weight $SiO_2$, 2.9 percent by weight $B_2O_3$ and 0.4 percent by weight $Al_2O_3$.

The turbine disk is completely embedded in a compound of glass particles in a graphite crucible. The glass in this compound consists of 80.3 percent by weight $SiO_2$, 12.2 percent by weight $B_2O_3$, 2.8 percent by weight Al₂O₃, 4.0 percent by weight Na₂O, 0.4 percent by weight K₂O and 0.3 percent by weight CaO.

The graphite crucible with its contents is thereafter placed in a high-pressure furnace of the type described in Example 1.

The preformed powder body with the glass wrapping is first degassed in the high-pressure furnace for approximately 2 hours at room temperature. Thereafter the furnace is heated to 950° C. When the temperature has reached 950° C. and the embedding glass has sintered densely, the pressure is raised by pumping in argon gas. The temperature is also raised to 1200° C., the embedding glass then forming a melt with a horizontal surface. At the pressure 100 MPa this temperature is maintained for 2 hours, the powder body then being completely densified. After a finished cycle, the furnace is allowed to cool to a suitable discharging temperature. The vessel then contains a blank cake in which the powder body is visible through the solidified and clear glass. The powder body is completely embedded in the glass and has thus been located below the surface of the melt in its entirety during the pressing. The glass may be removed in the manner described previously.

EXAMPLE 4

A divisible form or mould having a cavity shaped as a turbine disk and composed of an aluminum-silicate based material, for example of the same type as is normally used in cores for the investment casting of turbine blades having cooling channels, is filled with spherical powder of an iron-based alloy containing 0.18% C, 11.5% Cr, 0.25% Si, 0.5% Mo, 0.60% Mn, 4.4% Al, 0.01% P, 0.01S, 0.5% Ni, 0.30V, 0.25% Nb, the remainder being Fe and having a grain size of less than 250 microns. The powder is vibrated together by striking lightly on the form and the powder is sintered in a vacuum at about 1200° C. for 2 hours. After cooling, the reusable form is divided and the porous turbine disk having essentially the same dimensions as the forming cavity is removed. The porous turbine disk is thereafter provided with a blocking layer by being coated with a fine-grained powder of a grain size less than 1 micron of the same high-melting glass as in Example 1 or of boron nitride powder to a thickness of 0.3 mm.

The turbine disk is completely embedded in a mass of glass particles of the same kind as in Example 1 in a graphite crucible.

The graphite crucible with its contents is placed thereafter in a high-pressure furnace of the kind described in Example 1.

The preformed body with the glass wrapping is first degassed in a high-pressure furnace for 2 hours in room temperature. Thereafter, the furnace is heated to 750° C. At this temperature the pressure is increased by supplying hydrogen gas with about 100 mbar/min. While the temperature is raised by 5° C./min.

When the temperature has reached 950° C. and the embedding glass has sintered densely, the pressure is raised further by pumping in argon gas. The temperature is also raised to 1200° C., the glass then forming a melt. At the pressure 100 MPa this temperature is maintained for 2 hours, the powder body then being densified completely. The pressure and the temperature are then reduced and the crucible may be removed from the hot press. The sintered powder body is then obtained from a blank cake of glass, as described in Example 1.

We claim:

1. A method of manufacturing an object of metallic or ceramic material by the isostatic pressing of a body preformed of a powder of the material with a gaseous pressure medium while sintering said body, said method comprising:
   placing said preformed body and an embedding material therefor in an open top vessel which is resistant to the sintering temperature, said embedding material consisting of a glass or a material which forms glass upon heating;
   providing a blocking layer arranged around said preformed body, said blocking layer being comprised of finely divided boron nitride or of finely divided glass having a higher melting temperature than the glass in the embedding material, said embedding material being in direct contact with said blocking layer;
   transforming said embedding material in the vessel into a melt having a substantially horizontal upper surface limited by the walls of the vessel, said body and the blocking layer therearound being located beneath said surface, said melt presenting a casing that is impermeable to the gaseous pressure medium applied during said isostatic pressing, said transforming being accomplished prior to said isostatic pressing;
   isostatically pressing and sintering said body while applying said gaseous pressure medium directly to said upper surface of said melt; and
   maintaining the viscosity of the melt at $10^6$ poises or less when a pressure is required for isostatic pressing is applied on the melt, said blocking layer preventing glass of the melt from penetrating into the pores of the preformed body.

2. A method as set forth in claim 1 wherein said transforming step is accomplished while the body and the embedding material are subjected to a vacuum.

3. A method as set forth in claim 1 wherein said transforming step is accomplished while the body and the embedding material are in contact with a gas at a pressure which is at least as great as the pressure of the gas present in the pores of the powder body at the prevailing temperature.

* * * * *